United States Patent
Wu et al.

(10) Patent No.: US 10,020,889 B2
(45) Date of Patent: Jul. 10, 2018

(54) CHANNEL RANGING ADJUSTMENT IN MULTIPLE-WAVELENGTH PASSIVE OPTICAL NETWORKS (PONS)

(71) Applicant: Futurewei Technologies, Inc., Plano, TX (US)

(72) Inventors: Xuming Wu, Wuhan (CN); Yuanqiu Luo, Cranbury, NJ (US); Dekun Liu, Wuhan (CN); Jianhe Gao, Wuhan (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/080,297

(22) Filed: Mar. 24, 2016

(65) Prior Publication Data
US 2016/0285555 A1    Sep. 29, 2016

Related U.S. Application Data

(60) Provisional application No. 62/137,904, filed on Mar. 25, 2015.

(51) Int. Cl.
*H04B 10/27* (2013.01)
*H04Q 11/00* (2006.01)
*H04J 3/06* (2006.01)

(52) U.S. Cl.
CPC ........... *H04B 10/27* (2013.01); *H04J 3/0682* (2013.01); *H04Q 11/0067* (2013.01); *H04Q 2011/0081* (2013.01)

(58) Field of Classification Search
CPC ...... H04J 14/00; H04J 14/025; H04J 14/0221; H04B 10/27
See application file for complete search history.

(56) References Cited

U.S. PATENT DOCUMENTS

| 2010/0183316 A1 | 7/2010 | Gordon et al. |
| 2014/0233944 A1* | 8/2014 | Vetter ............... H04J 14/0282 398/34 |

(Continued)

OTHER PUBLICATIONS

ITU-T G.989.3 Series G: Transmission Systems and Media, Digital Systems and Networks Digital sections and digital line system — Optical line systems for local and access networks Phoneline networking ransceivers — Isolation function, Mar. 2003, Telecommunication Standardization Sector of ITU, International Telecommunication Union, 20 pages.

(Continued)

*Primary Examiner* — Dzung Tran
(74) *Attorney, Agent, or Firm* — Futurewei Technologies. Inc.

(57) ABSTRACT

A passive optical network (PON) includes a first optical line terminal (OLT), a second OLT, and an optical network unit (ONU). The first OLT sends an equalization delay change message to the ONU, wherein the equalization delay change message includes an equalization delay, an upstream channel ID and a downstream channel ID corresponding to the equalization delay. The ONU receives the equalization delay change message. When the ONU tunes from the first OLT to the second OLT, the ONU obtains the equalization delay for upstream transmission according to the upstream channel ID and the downstream channel ID.

20 Claims, 7 Drawing Sheets

(56) References Cited

U.S. PATENT DOCUMENTS

| | | | |
|---|---|---|---|
| 2014/0233954 A1* | 8/2014 | Lee | H04J 14/0246 398/72 |
| 2015/0365191 A1* | 12/2015 | Lee | H04J 14/0246 398/67 |
| 2016/0073180 A1* | 3/2016 | Khotimsky | H04Q 11/0067 398/34 |
| 2016/0087748 A1* | 3/2016 | Khotimsky | H04B 10/272 398/67 |

OTHER PUBLICATIONS

ITU-T G.989.3, Draft new Recommendation ITU-T G.989.3 (for Consent, Nov. 2014), Study Group 15 TD 289.(PLEN/15), Telecommunication Standardization Sector, International Telecommunication Union, Mar. 24-Apr. 4, 2014, 199 pages.

ITU-T G.984.3 Amendment 3 Series G: Transmission Systems and Media, Digital Systems and Networks Digital sections and digital line system — Optical line systems for local and access networks Gigabit-capable Passive Optical Networks(G-PON): Transmission convergence layer specification Amendment 3, Apr. 2012, Telecommunication Standardization Sector of ITU, 18 pages.

* cited by examiner

| Octet | Content | Description |
|---|---|---|
| 1-2 | ONU-ID | Directed message to one ONU or broadcast message to all ONUs.<br>As a broadcast to all ONUs, ONU-ID = 0x03FF. |
| 3 | 0x04 | Message type ID "Ranging_Time". |
| 4 | SeqNo | Unicast or broadcast PLOAM sequence number. |
| 5 | 0000 00SP | Bit mask that indicates how the EqualizationDelay field is to be interpreted.<br>Bit P = 1-The delay in bytes 6-9 is absolute; ignore S.<br>Bit P = 0-The delay in bytes 6-9 is relative; S determines sign.<br>Bit S = 0-Positive: increase the current EqD by the specified value.<br>Bit S = 1-Negative: decrease the current EqD by the specified value. |
| 6-9 | EqualizationDelay | Equalization delay value, expressed in bit times with respect to the nominal upstream line rate of 2.48832 Gbit/s, regardless of the actual upstream line rate of the ONU. |
| 10-N | Upstream wavelength channel or upstream OLT CT | Upstream wavelength Channel ID and/or upstream OLT CT PON-ID |
| (N+1)-M | Downstream wavelength channel or downstream OLT CT | Downstream wavelength Channel ID and/or downstream OLT CT PON-ID |
| (M+1)-40 | Padding | Set to 0x00 by the transmitter; treated as "don't care" by the receiver. |
| 41-48 | MIC | Message integrity check |

FIG. 2

| Octet | Content | Description |
|---|---|---|
| 1-2 | ONU-ID | Directed message to one ONU. |
| 3 | 0x15 | Message type ID "Tuning_Control". |
| 4 | SeqNo | Unicast PLOAM sequence number. |
| 5 | Operation Code | 0x00: Request;<br>All parameters are applicable.<br>0x01: Complete_d<br>Target downstream and upstream PON-ID parameters are applicable. Octets 6..8 and 17 are set to 0x00 by the OLT CT and ignored by the ONU. |
| 6-7 | Scheduled SFC | The 16 least significant bits of the superframe counter value of the PHY frame in the future when the ONU has to commence the transceiver tuning operation.<br>The specified value pertains to both downstream and upstream tuning. Whenever separate tuning is deemed beneficial, two unidirectional tuning actions executed serially can be considered. |
| 8 | Rollback flag | A bitmap of the form 0000 000R, where:<br>R – Rollback flag<br>R=1: rollback available when tuning fails;<br>R=0: no rollback available when tuning fails; |
| 9-12 | Target downstream PON-ID | The 32-bt PON-ID of the channel profile that contains the descriptor for the target downstream wavelength channel. |
| 13-16 | Target upstream PON-ID | The 32-bt PON-ID of the channel profile that contains the descriptor for the target upstream wavelength channel. |
| 17 | Calibration flag | A bitmap of the form 0000 000R, where:<br>R – Calibration flag<br>R = 0: if ONU has no calibration information for target wavelength channel, the ONU responds with NACK by lack of calibration and ignores tuning request;<br>R = 1: if ONU has no calibration information for target wavelength channel, the ONU should execute tuning request with necessary calibration, |
| 18-40 | Padding | Set to 0x00 by the transmitter; treated as "don't care" by the receiver. |
| 41-48 | MIC | Message integrity check. computed using the default PLOAM integrity key |

FIG. 4

CHANNEL RANGING ADJUSTMENT IN MULTIPLE-WAVELENGTH PASSIVE OPTICAL NETWORKS (PONS)

CROSS-REFERENCE TO RELATED APPLICATIONS

This application claims priority to U.S. Provisional Application No. 62/137,904 entitled "Channel Ranging Adjustment in Multiple-Wavelength Passive Optical Networks (PONs)," filed on Mar. 25, 2015, hereby incorporated by reference in its entirety.

BACKGROUND

A passive optical network (PON) is one system for providing network access over the last mile, which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mb/s).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT. Next-generation PONs (NG-PONs) and NG-PON2s may include point-to-point WDM PONs (P2P-WDM PONs), which may provide data rates higher than 10 Gb/s.

NG-PONs and NG-PON2s may also include time- and wavelength-division multiplexing (TWDM) PONs, which may also provide data rates higher than 10 Gb/s. TWDM PONs may combine TDMA and WDMA to support higher capacity so that an increased number of users can be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure includes a system, a method, and an apparatus for determining and distributing channel ranging adjustments as shown and described.

In an embodiment, a passive optical network (PON) includes a first optical line terminal (OLT), a second OLT, and an optical network unit (ONU). The first OLT sends an equalization delay change message to the ONU, wherein the equalization delay change message includes an equalization delay, an upstream channel ID and a downstream channel ID corresponding to the equalization delay. The ONU receives the equalization delay change message. When the ONU tunes from the first OLT to the second OLT, the ONU obtains the equalization delay for upstream transmission according to the upstream channel ID and the downstream channel ID.

In another embodiment, the first OLT generates a tuning control message and sends the tuning control message to the ONU, wherein the tuning control message instructs the ONU to tune from the first OLT to the second OLT.

In other embodiment, the equalization delay includes a delay delta value between the first OLT and the second OLT or an absolute equalization delay.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates an example of a revised Ranging_Time PLOAM message.

FIG. 4 illustrates an example of a tuning control message.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
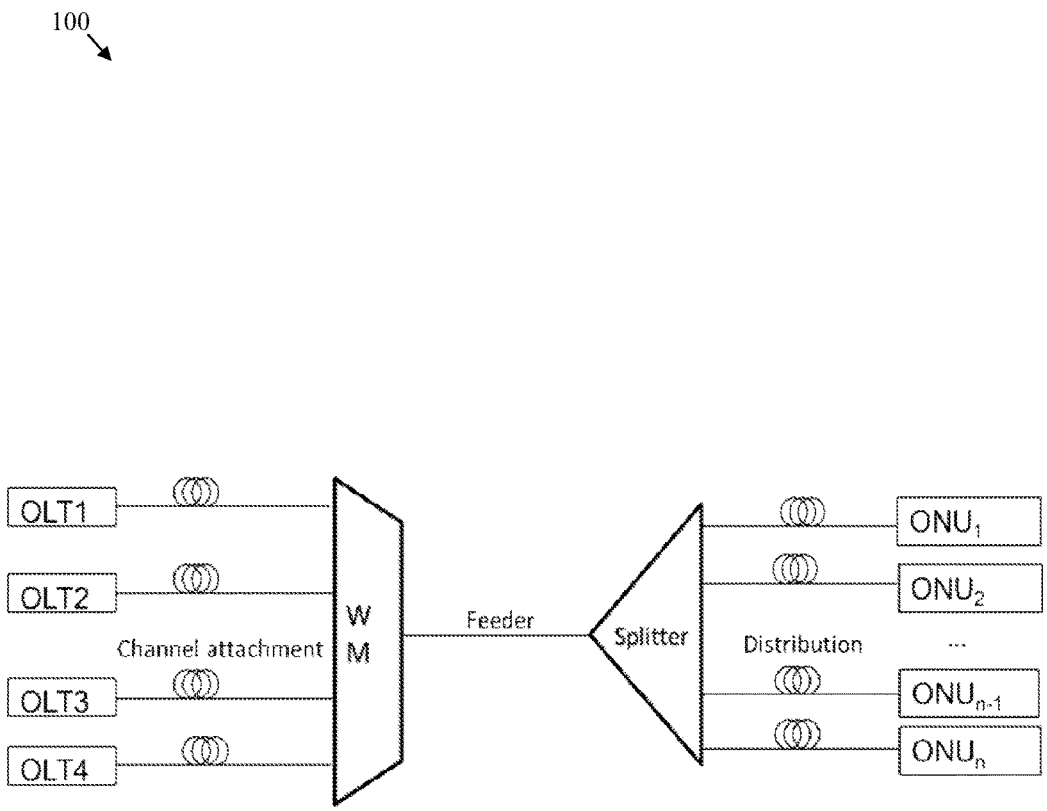
FIG. 1 is a schematic diagram of an embodiment of a time- and wavelength-division multiplexed PON (TWDM-PON) system architecture.

FIG. 1 is a schematic diagram of an embodiment of a time- and wavelength-division multiplexed PON (TWDM-PON) system architecture 100 with four optical line terminal (OLT) ports or OLT channel terminations (CTs). TWDM-PON has been selected as the solution for the next generation passive optical network (PON) with a minimum capacity of 40 gigabits per second (Gb/s). In a typical TWDM-PON system, there are up to eight wavelengths in both upstream and downstream directions. Upstream refers to the direction of communication from an ONU to an OLT, whereas downstream refers to the direction of communication from the OLT to the ONU. As such, ONUs that operate in multiple-wavelength PONs are wavelength-tunable ONUs, which are built with optical modules that are wavelength tunable in both the upstream and the downstream directions. For example, a tunable optical module may comprise a configurable optical tunable filter in a receive path for selecting a receive wavelength and a tunable wavelength controller in a transmit path for tuning to a transmit wavelength. The tunable optical modules may be designed by employing various technologies, such as thermal tuning, voltage or current tuning, and mechanical tuning.

The fiber distance between an OLT CT and an ONU comprises lengths of a channel attachment fiber, a feeder fiber, and a distribution fiber. In some implementation scenarios (such as, TWDM PON with non-integrated OLT), the OLT CTs are separate and the wavelength multiplexer (WM) is outside the OLT line card. In this case, the fiber lengths between the WM and different OLT CTs (i.e., channel attachment fiber lengths) could be different. The distance between the ONU and the OLT CTs would change when the ONU tunes its wavelength channel from one OLT CT to another. This may lead to inaccurate ranging. Usually, during a ranging phase, the ONU responds to directed ranging grants. The phase concludes when the OLT CT completes the round-trip delay measurements, calculates the equalization delay, and communicates the equalization delay to the ONU. It often takes a long time to perform the round-trip delay measurements for the OLT CT. If the ONU and the new OLT CT continue to use the original ranging information after ONU wavelength tuning, the upstream transmissions from the ONU will become unaligned. In the worst case, the ONU transmits in another ONU's timeslots in the upstream and it becomes a rogue ONU.

The ONU ranging problem is shown in Eq. (1). For ONU_i working under OLT CT_j, its zero-distance equalization delay (Teqd) equals to the sum of its round-trip delay (RTD) and equalization delay (EqD). The RTD is composed of the round-trip propagation delay, which is proportional to the ONU's fiber distance, and the ONU response time.

$$Teqd\_i\_j = RTD\_i\_j + EqD\_i\_j. \qquad \text{Eq. (1)}$$

The OLT or OLT CT transmits a downstream PHY (physical) frame periodically. Because of the varying fibre distance, each given PHY frame reaches different ONUs at generally different time instants. With each received downstream PHY frame, an ONU associates the corresponding upstream PHY frame. The individual EqDs established in the course of ONU ranging serve to synchronise all ONUs to the same reference at the start of each upstream PHY frame in such a way that upstream transmissions by any two ONUs, occurring at the same offset with respect to the start of the upstream PHY frame, would reach the OLT CT at the same time.

The OLT or OLT CT j first selects the Teqd, and as the ONUs activate on the PON, assigns the equalization delay $EqD\_i\_j$ to the $ONU_i$ to compensate for the difference in the lengths of distribution fiber segments. However, if each OLT CT j selects the Teqd_j independently, then the assigned equalization delays EqD_i_j are generally inconsistent across OLT CTs: an ONU retaining its equalization delay upon handover may cause rogue interference on the target TWDM channel. Teqd_j can be preconfigured or dynamically configured during runtime. To make the equalization delay assignment consistent across PON channels, the OLT CTs should select their respective zero-distance equalization delays in a coordinated fashion to compensate for the difference in the lengths of the channel attachment segments.

When the fiber distance between OLT CT_j and ONU_i changes, the value of RTD_i_j changes accordingly. There are generally three ways to accommodate such changes. A first method updates EqD_i_j by measuring the new RTD, a second method updates Teqd_i_j by assuming a new Teqd value to maintain the existing EqD, and a third method updates both EqD_i_j and Teqd_i_j by distributing the RTD change into two parts.

In a multi-channel TWDM PON system, the RTD may change when a particular ONU tunes its wavelength from one channel to a target channel. In order to prevent the rogue ONU problem, the ONU ranging information may be updated before entering Operation State (OS) in the target wavelength channel. There are two existing solutions. Re-ranging is one way to update the ONU ranging information. In the target channel, the new OLT CT issues a directed ranging grant to the ONU and prepares to measure the ONU response time. The ONU responds with the Registration physical layer operations, administration, and maintenance (PLOAM) message. The OLT CT computes the individual EqD and communicates this EqD value to the ONU using the Ranging_Time PLOAM message. If the OLT does not have enough information about ONU's EqD in target channels, it really needs the OLT re-ranges the ONU before the ONU sends the Tuning_Response (Complete_u) PLOAM message. Re-ranging falls into the category of updating EqD by measuring the new RTD. The re-ranging process needs to open a "quiet window" for ONU response time measurement. This increases the waiting time and would eventually impact services to and from other ONUs operating under the new OLT CT.

Another solution is ONU ranging with consistent EqDs across TWDM channel. An example of this solution is called consistent EqD. Details for consistent EqD are described in International Telecommunication Union Standardization (ITU-T) G.989.3 titled, "Recommendation draft Appendix VII." In this solution a "pilot" ONU is selected for ranging across all available OLT CTs. The OLT CTs select their respective Teqd in a coordinated fashion to compensate the length difference of the channel attachment segments. The ONU is thus assigned a consistent EqD that is valid to all OLT CTs. Consistent EqD accommodates fiber distance changes by using different Teqd values for different OLT CTs. An ONU would use the same EqD value across all OLT CTs.

Consistent EqD falls into the category of updating Teqd. There are several cases that Consistent EqD cannot accurately fulfill ranging update. First, the Consistent EqD method employs a global maximum of Teqd among the active OLT CTs to calculate their specific Teqd and the consistent EqD. When a new OLT CT with channel attachment fiber longer than any active OLT CTs joins the system, all OLT CTs should begin ranging again, and the specific Teqd and consistent EqD values need change. This happens in a pay as you grow deployment, where new OLT CTs are activated as business grows. All OLT CTs have to adjust their specific Tedq values. Ranging_Time PLOAMs with the new EqD values should be sent to each ONU. That is to say, the steps of specific Teqd calculation and consistent EqD update have to be redone.

Second, consistent EqD generates specific Teqd for each active OLT CT. The Teqd of an OLT CT is different from another OLT CT. This may cause problems for quiet window synchronization among multiple active OLT CTs. When at least two OLT CTs need to coordinate upstream transmission, they have to adjust their Teqd difference via message exchange by using the inter channel termination protocol (ICTP).

Third, when the ONU's upstream channel and downstream channel are with different OLT CTs, consistent EqD may not work. Consistent EqD assumes that the ONUs are associated with a particular OLT CT, that the downstream and upstream channels are pairwise associated, and the transmission delay is same in the downstream and upstream directions or with negligible difference due to group velocity refractive index. The Teqd and EqD adjustment calculation is based on the symmetrical transmission delay assumption. When the ONU's upstream and downstream wavelengths are associated with different OLT CTs and the channel attachment fiber lengths are different, the delay adjustments in consistent EqD are not valid which introduces errors.

To state this problem in another way, in a TWDM-PON system with N channels, the consistent EqD method has N degrees of freedom (i.e., there are N EqDs that can be adjusted) to obtain equivalent ranging delays. However, the arbitrary connection of ONUs to channel pairs presents $N^2$ constraints on the system (i.e., there are $N^2$ possible combinations of downstream and upstream channels). Thus, there is no solution to this over-constrained system of equations.

Disclosed herein are various embodiments for addressing channel ranging time adjustments in multiple-wavelength PONs. In an embodiment, EqDs may be updated when RTD changes without re-ranging. The OLT CT collects the EqD value in a target channel and sends updated ranging information to the ONU before ONU wavelength channel tuning. The ONU stores the EqD of the target channel and directly responds to data transmission grants in the target channel by using the corresponding EqD. When an ONU tunes form a source OLT CT to a target OLT CT, RTD may change as the channel attachment fiber may change. This particular change is the same for all ONUs tuning between the same two OLT CTs, as the channel attached fiber is shared by all ONUs. Once an ONU completes ranging in different wavelength channels, the channel attachment fiber differences are known. When another ONU needs to tune its wavelength from the same source OLT CT to the same target OLT CT, the source OLT CT calculates EqD in the target OLT CT with the measured channel attachment fiber difference and sends it to the ONU in the source channel before the ONU conducts wavelength tuning. In the embodiment, before the ONU conducts wavelength tuning, the ONU gets the EqD of the target OLT CT from the source OLT CT. Thus, the ONU does not need to wait the target OLT CT to perform the round-trip delay measurements during the re-ranging stage. Moreover, if ONU stores the EqD of the target OLT CT, the ONU can directly respond to data transmission grants in the target OLT CT during another re-ranging stage. Thus, service interruption in the embodiment is reduced during the re-ranging stage.

FIG. 2 is an illustration of an exemplary embodiment of a revised Ranging_Time PLOAM message. This message is revised from the Ranging_Time PLOAM message described in ITU-T G.989.3, which is hereby incorporated by reference as if reproduced in its entirety. An upstream wavelength channel/upstream OLT CT field and a downstream wavelength channel/downstream OLT CT field are added to the message. Upstream channel ID, which is indicated by the upstream wavelength channel/upstream OLT CT field, includes an upstream wavelength Channel ID and/or an upstream CT ID. Similarly, downstream channel ID, which is indicated by the downstream wavelength channel/downstream OLT CT field, includes a downstream wavelength Channel ID and/or a downstream channel termination (CT) ID. With this revised message, when Ranging_Time is sent directly to an ONU, the OLT CT can send EqD information of any channel pair specified by the two newly added fields to the ONU. The ONU would store the information locally, and update the EqD with the stored information when it starts the wavelength tuning process. The ONU can respond to the data transmission grants directly in the target channel without re-ranging. FIG. 2 is only an example for the ranging time message. Other messages could also be used in the embodiments.

When the message is broadcast, the OLT CT announces the relative EqD changes between current operation channel and the channel pair specified the two new fields to all associated ONUs. The ONUs store the ranging information locally and update the EqD when they tune to the channel pair. The pre-announced EqD information helps conducting fast channel switch by eliminating the steps of ONU re-ranging.

In wavelength-stacked Institute of Electrical and Electronics Engineers (IEEE) Ethernet passive optical network (EPON) or 10 Gbit/s EPON (10 GEPON) systems, the EqD values of ONUs are kept at the OLT CTs. The OLT CTs may share the EqD and ranging time difference information via an inter channel termination protocol (ICTP). The EqD is delivered among OLT CTs by using a message similar to the one in FIG. 2. The message key content comprises an EqD or an EqD adjustment, an upstream wavelength channel/upstream OLT CT, and a downstream wavelength channel/downstream OLT CT. When an ONU changes its wavelength channel from OLT CT1 to OLT CT2, OLT CT2 should adjusts the ONU EqD by taking the ranging time difference into consideration. OLT CT2 assigns upstream data transmission opportunities to the ONU by pre-compensating the new EqD in the start time of the GATE message.

Ranging time difference among TWDM-PON wavelength channels may be collected. In an embodiment, ranging time collection may be implemented during activation. When the system is initialized, the OLT CTs pick one ONU as a "pilot" ONU to complete the ranging process in all available TWDM-PON channels. The OLT CTs thus collect the channel attachment fiber differences from the "pilot" ONU ranging. Such information collection may be done via the ICTP. The difference of the "pilot" ONU is the same for other ONUs. When a new ONU joins the TWDM-PON system, the ONU only needs to complete ranging process with one OLT CT, and its ranging information with other OLT CTs can be calculated from the measured channel attachment fiber differences.

In another embodiment, ranging time collection may be implemented using power saving ONUs. When the system is in an operation state, some ONUs may work in power saving mode. The OLT CTs would select one ONU in power saving mode as the "pilot" ONU to complete the ranging process with all available TWDM-PON channels. The OLT CTs may share and exchange the channel attachment fiber differences via ICTP.

In yet another embodiment, ranging time collection may be implemented using wavelength tuning. When the system is in an operation state, some ONUs may be instructed to tune their wavelength channels. If the ONU does not have the ranging information of the target channel, it may need to complete the ranging process. The OLT CTs can select the tuning ONU as the "pilot" ONU to complete the ranging process in the target channel. Once the ONU completes it, the channel attachment fiber difference of the source channel and the target channel can be known via ICTP. The OLT CTs are aware of the channel attachment fiber differences of all wavelength channels after several tuning ONUs are selected as the "pilot" ONUs and complete ranging process in all TWDM-PON channels.

An EqD update may be performed using OLT CTs to calculate the new EqD and/or EqD adjustment. The OLT CTs send the new EqD and/or EqD adjustment to the ONUs via downstream messages. The ONUs employ the new values directly when they work with the corresponding wavelength channels. The revised Ranging_Time PLOAM message in FIG. 2 is an example of the downstream message to distribute EqD and/or EqD adjustment. Another example is adding EqD information to the Channel_Profile PLOAM message specified by ITU-T G.989.3, which is incorporated by reference.

Alternatively, the OLT CTs only provide necessary information, and the ONUs conduct the actual EqD calculation. For example, the OLT CTs only inform of the ONUs of the EqDs under a single OLT CT (i.e., EqD_i_j, EqD_i_k, and EqD_n_j). Messages such as Ranging_Time PLOAM and Channel_Profile PLOAM can be employed to distribute the EqD information. When ONU_i changes its upstream to OLT CT_k while its downstream is still with OLT CT_j, ONU_i conducts EqD update as EqD_i_j_k=0.5*EqD_i_j+ 0.5*EqD_i_k. This shifts a portion of the calculation to the ONUs and it may not be necessary to announce all EqD values in the system.

In various embodiments, re-ranging time is eliminated, or substantially reduced, by notifying ONUs of their EqD and/or EqD adjustments before the actual channel tuning or switch. As such, services with the target OLT CT are maintained. Sending EqD information of other wavelength channels to ONUs by an OLT CT is also supported, unlike for consistent EqD. ONU are allowed to have different EqD values with different OLT CTs. When an OLT CT with long channel attachment fiber joins the system, the OLT CT may only need one ONU to perform ranging with the new OLT CT. The ranging time difference may be calculated and distributed to other OLT CTs via ICTP, and such difference is implicitly adjusted at the OLT CTs. Unlike consistent EqD, there is no need to redo the steps to change all Teqd and EqD values. Teqd selection is independent from the EqD calculation. Teqd values of OLT CTs can be set by using the same value. This helps quiet window synchronization among multiple OLT CTs. EqDs and EqD adjustments can be accurately calculated to avoid the errors from symmetrical delay assumption in consistent EqD. For example, assume RTD of an ONU under OLT CT1 is RTD1 and under OLT CT2 is RTD2. When the ONU's upstream is with OLT CT1 and downstream is with OLT CT2, the new RTD of the ONU equals the average value of RTD1 and RTD2 (i.e., 0.5*RTD1+0.5*RTD2). An EqD adjustment with asymmetrical transmission delay can be accurately calculated since an ONU does not have to maintain a consistent EqD with all OLT CTs. EqD adjustments may be sent to the ONU via the revised Ranging_Time message. This increases implementation flexibility as TWDM-PON allows flexible upstream and downstream wavelength channel pairing across the active OLT CTs.

Figure 3:
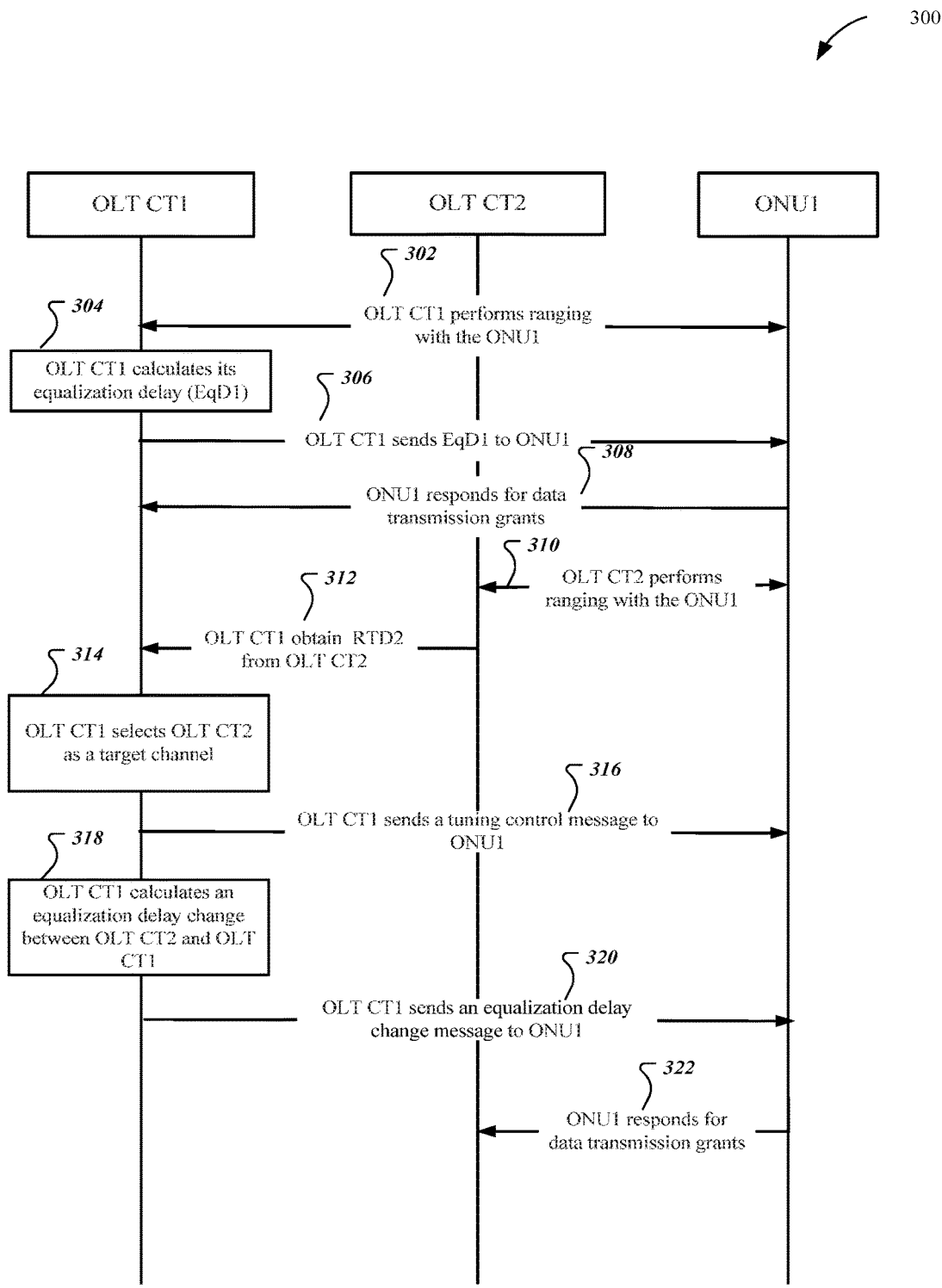
FIG. 3 is an exemplary flowchart showing an example for channel ranging adjustment in multiple-wavelength PONs.

FIG. 3 is an exemplary flowchart showing an example for channel ranging adjustment in multiple-wavelength PONs. This activation process is performed under the control of the OLT CT1 and OLT CT2 through the exchange of messages with the ONU1. Following the OLT CT1 assigns an ONU-ID to the ONU1, the OLT CT1 performs ranging with the ONU1 in step 302. During the ranging stage, the OLT CT1 measures a round-trip delay (RTD1) between OLT CT1 and ONU1. The OLT CT1 calculates its equalization delay (EqD1) according to RTD1 and Eq. (1) in step 304. Then the OLT CT1 sends the EqD1 to the ONU1 in step 306. The ONU1 responds for data transmission grants to the OLT CT1 in step 308. The OLT CT2 performs ranging with the ONU1 in step 310. During the ranging stage, the OLT CT2 measures a round-trip delay (RTD2) between OLT CT2 and ONU1. OLT CT1 obtains RTD2 between OLT CT2 and ONU1 via ICTP in step 312. In the example of FIG. 3, the steps 302-308 can be performed in parallel with (at or about the same time as) the steps 310-312. That is, they are not necessarily performed sequentially as depicted in FIG. 3.

OLT CT1 selects a suitable OLT CT as a target channel according to loads of OLT CTs or a preset policy in step 314. For example, if load of OLT CT1 is much heavier than that of OLT CT2, OLT CT1 selects OLT CT2 in the process of ONU wavelength channel handover in order to balance loads between different CTs. In another example, load of OLT CT3 is much lighter than that of other CTs. If the preset policy is saving power, OLT CT1 may change the loads from OLT CT3 to OLT CT2, and shut down OLT CT3 in order to saving power. The preset policy can also include least load first, and maximum load first. After OLT CT1 selects the suitable OLT CT in step 314, such as OLT CT2, OLT CT1 sends a tuning control message to ONU1 in step 316. In the tuning control message as illustrated in FIG. 4, ONU ID is indicated in Octet 1-2. Scheduled SFC is used to indicate when the ONU has to commence the transceiver tuning operation in Octet 6-7. Rollback flag is used to indicate how the ONU could do if tuning fails in Octet 8. Target downstream PON-ID contains the descriptor for the target downstream wavelength channel in Octet 9-12. Target upstream PON-ID contains the descriptor for the target upstream wavelength channel in Octet 13-16. The tuning control message instructs the ONU to tune from a source OLT to a target OLT. When ONU1 receives this message, ONU1 would know when and how to tune the upstream channel and the downstream channel. FIG. 4 is only an example for the tuning control message. Other messages could also be used in the embodiments.

OLT CT1 generates an equalization delay change between OLT CT2 and OLT CT1 in step 318, and sends an equalization delay change message to ONU1 in step 320. The equalization delay change message contains the equalization delay change, an upstream channel ID and a downstream channel ID corresponding to the equalization delay change. The equalization delay change includes a delay delta value or an absolute equalization delay. Usually, the equalization delay change is generated according to RTD1 and/or RTD2. FIG. 5(a)-FIG. 5(e) shows some examples on how to generate the equalization delay change and how to generate the upstream channel ID and the downstream channel ID corresponding to the equalization delay change. After the ONU1 tunes from OLT CT1 to OLT CT2 according to the tuning control message, the ONU1 obtains the equalization delay change for upstream transmission according to the upstream channel ID and the downstream channel ID carried by the equalization delay change message. The ONU1 responds for data transmission grants to the OLT CT2 in step 322.

Figure 5A:
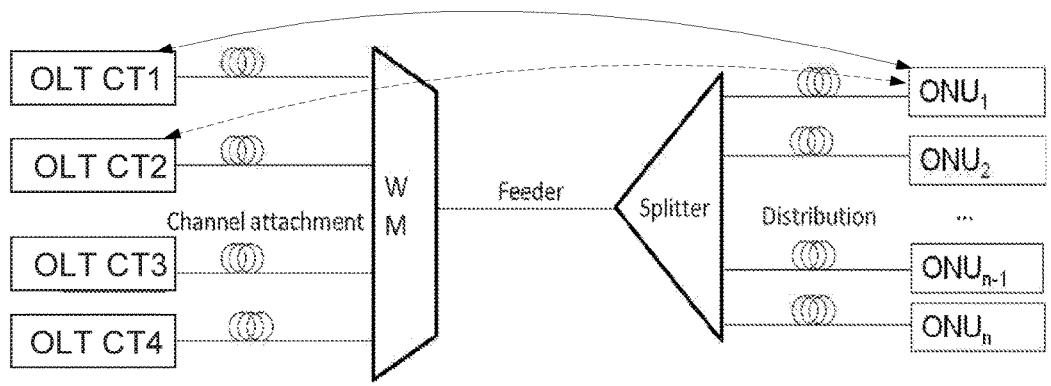
FIG. 5($a$)-5($e$) are examples for channel switching in multiple-wavelength PONs.

As showed in FIG. 5(a), if OLT CT1 decides that the ONU1 tunes an upstream channel and a downstream channel from OLT CT1 to OLT CT2, OLT CT1 sends a delay delta value or an absolute equalization delay to ONU1. Eq. (2a) or Eq. (2b) is used to show the delay delta value, and Eq. (3) is used to show the absolute equalization delay. In this scenario, the upstream channel ID and the downstream channel ID identify OLT CT2. The equalization delay change includes the delay delta value or the absolute equalization delay.

$$\Delta EqD1,2=(Teqd-RTD1)-(Teqd-RTD2)=RTD2-RTD1. \quad \text{Eq. (2a)}$$

$$\Delta EqD2,1=(Teqd-RTD2)-(Teqd-RTD1)=RTD1-RTD2. \quad \text{Eq. (2b)}$$

$$EqD2=Teqd-RTD2. \quad \text{Eq. (3)}$$

Figure 5B:
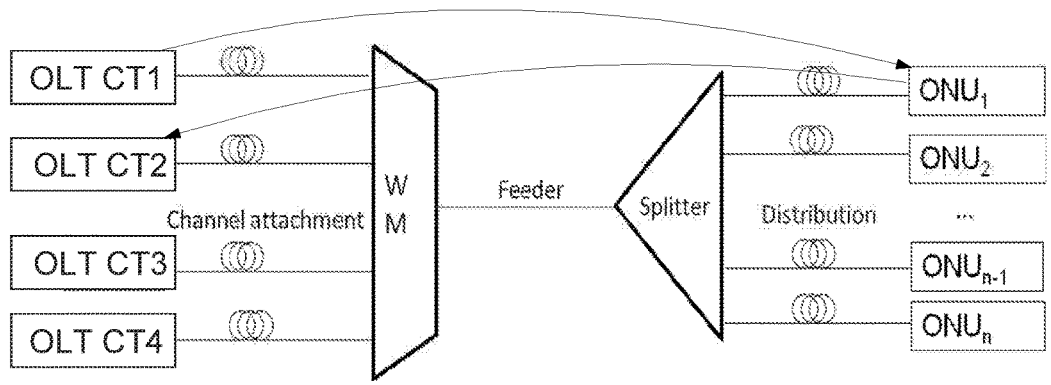

As showed in FIG. 5(b), if OLT CT1 decides that the ONU1 tunes an upstream channel from OLT CT1 to OLT CT2, keeps a downstream channel at OLT CT1, OLT CT1 sends a delay delta value or an absolute equalization delay to ONU1. Eq. (4a) or Eq. (4b) is used to show the delay delta value, and Eq. (5) is used to show the absolute equalization delay. In this scenario, the upstream channel ID identifies OLT CT2, and the downstream channel ID identifies OLT CT1. The equalization delay change includes the delay delta value or the absolute equalization delay.

$$\Delta EqD1.5,2.5 = (Teqd-RTD1)/2 - (Teqd-RTD2)/2 = (RTD2-RTD1)/2. \quad \text{Eq. (4a)}$$

$$\Delta EqD2.5,1.5 = (Teqd-RTD2)/2 - (Teqd-RTD1)/2 = (RTD1-RTD2)/2. \quad \text{Eq. (4b)}$$

$$EqD2.5,1.5 = Teqd - (RTD1+RTD2)/2. \quad \text{Eq. (5)}$$

Figure 5C:
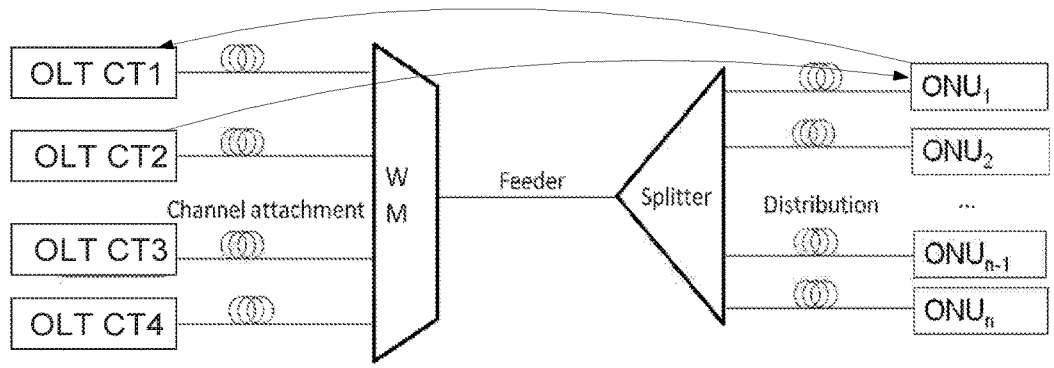

As showed in FIG. 5(c), if OLT CT1 decides that the ONU1 tunes a downstream channel from OLT CT1 to OLT CT2, and keeps an upstream channel at OLT CT1, OLT CT1 sends a delay delta value or an absolute equalization delay to ONU1. In this scenario, the upstream channel ID identifies OLT CT1, and the downstream channel ID identifies OLT CT2. The delay delta value can be obtained according to Eq. (4a) or Eq. (4b). The absolute equalization delay can be obtained according to Eq. (5).

Figure 5D:
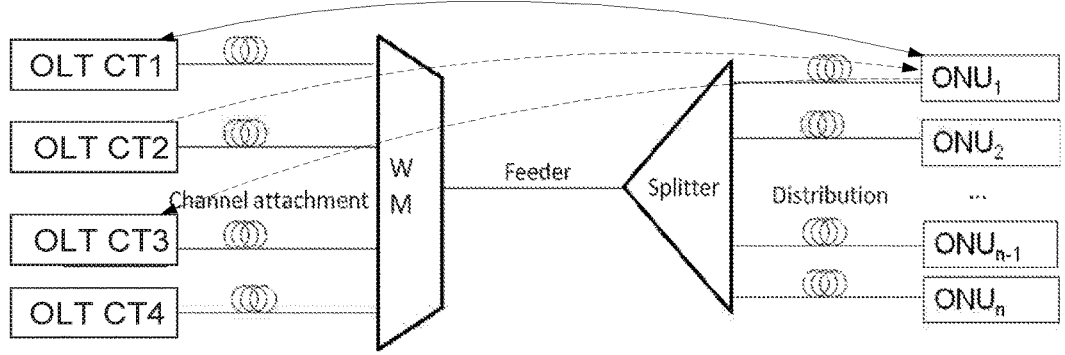

As showed in FIG. 5(d), if OLT CT1 decides that the ONU1 tunes an upstream channel from OLT CT1 to OLT CT3, and tunes a downstream channel from OLT CT1 to OLT CT2, OLT CT1 sends a delay delta value or an absolute equalization delay to ONU1. Eq. (6a) or Eq. (6b) is used to show the delay delta value, and Eq. (7) is used to show the absolute equalization delay. In this scenario, the upstream channel ID identifies OLT CT3, and the downstream channel ID identifies OLT CT2. The equalization delay change includes the delay delta value or the absolute equalization delay.

$$\Delta EqD1,2,3 = (Teqd-RTD1) - (Teqd-RTD2)/2 - (Teqd-RTD3)/2 = (RTD2+RTD3)/2 - RTD1. \quad \text{Eq. (6a)}$$

$$\Delta EqD2,3,1 = (Teqd-RTD2)/2 + (Teqd-RTD3)/2 - (Teqd-RTD1) = RTD1 - (RTD2+RTD3)/2. \quad \text{Eq. (6b)}$$

$$EqD2,3 = (Teqd-RTD2)/2 + (Teqd-RTD3)/2. \quad \text{Eq. (7)}$$

Figure 5E:
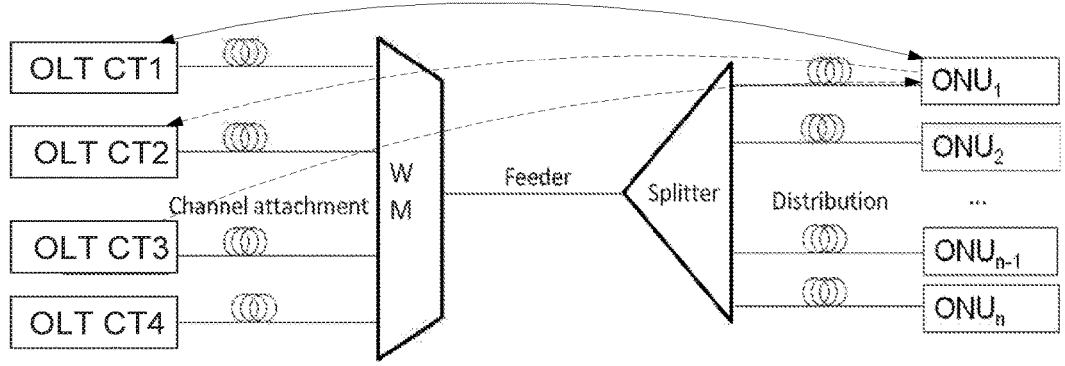

As showed in FIG. 5(e), if OLT CT1 decides that the ONU1 tunes an upstream channel from OLT CT1 to OLT CT2, and tunes a downstream channel from OLT CT1 to OLT CT3, OLT CT1 sends a delay delta value or an absolute equalization delay to ONU1. Eq. (6a) or Eq. (6b) is used to show the delay delta value, and Eq. (7) is used to show the absolute equalization delay. In this scenario, the upstream channel ID identifies OLT CT2, and the downstream channel ID identifies OLT CT1. The equalization delay change includes the delay delta value or the absolute equalization delay.

FIG. 5(a)-FIG. 5(e) are examples to illustrate some scenarios. There are other scenarios could be used in embodiments. Such as, OLT CT1 has an upstream channel with ONU1, and OLT CT2 has a downstream channel with ONU1 before handover. Then OLT CT2 decides that the ONU1 tunes an upstream channel from OLT CT1 to OLT CT3, a downstream channel from OLT CT2 to OLT CT4.

Figure 6:
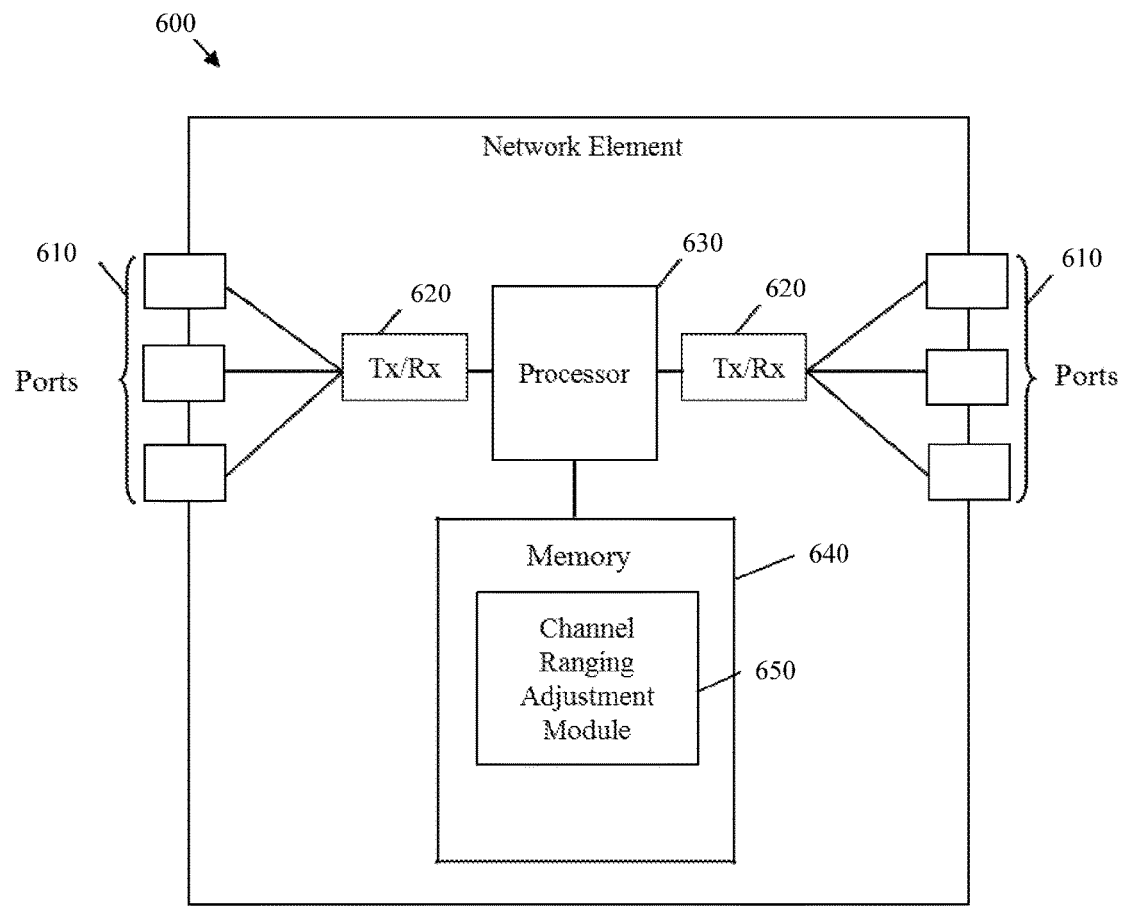
FIG. 6 is a schematic diagram of a network element.

FIG. 6 is a schematic diagram of a network element 600 for determining and distributing channel ranging adjustments. The network element 600 may be suitable for implementing the disclosed embodiments. For instance, the network element 600 may implement an OLT or an ONU. Network element 600 comprises ports 610, transceiver units (Tx/Rx) 620, a processor 630, and a memory 640 comprising a channel ranging adjustment module 650. Ports 610 are coupled to Tx/Rx 620, which may be transmitters, receivers, or combinations thereof. The Tx/Rx 620 may transmit and receive data via the ports 610. Processor 630 is configured to process data. Memory 640 is configured to store data and instructions for implementing embodiments described herein. The network element 600 may also comprise electrical-to-optical (EO) components and optical-to-electrical (OE) components coupled to the ports 610 and Tx/Rx 620 for receiving and transmitting electrical signals and optical signals.

The processor 630 may be implemented by hardware and software. The processor 630 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 630 is in communication with the ports 610, Tx/Rx 620, and memory 640.

The memory 640 comprises one or more of disks, tape drives, and solid-state drives and may be used as an over-flow data storage device, to store programs or programming when such programs are selected for execution, and to store instructions and data that are read during program execution. The memory 640 may be volatile and non-volatile and may be read-only memory (ROM), random-access memory (RAM), ternary content-addressable memory (TCAM), and static random-access memory (SRAM). Channel ranging adjustment module 650 is implemented by processor 630 to execute the instructions for implementing various embodiments previously discussed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A passive optical network (PON), comprising;
an optical network unit (ONU);
a second optical line terminal (OLT); and
a first OLT in communication with the ONU and with the second OLT, with the first OLT:
generating an equalization delay change message, the equalization delay change message comprising a value of an equalization delay for an upstream and downstream wavelength pair, an upstream channel ID and a downstream channel ID, wherein the upstream channel ID contains a descriptor for an upstream wavelength of the upstream and downstream wavelength pair, and the downstream channel ID contains a descriptor for a downstream wavelength of the upstream and downstream wavelength pair; and sending the equalization delay change message to the ONU; with the ONU;

receiving the equalization delay change message, and obtaining the value of the equalization delay according to the upstream channel ID and the downstream channel ID for tuning from the first OLT to a second OLT.

2. The network of claim 1, wherein the value of the equalization delay includes a delay delta value between the first OLT and the second OLT.

3. The network of claim 1, wherein the value of the equalization delay includes an absolute equalization delay of the second OLT.

4. The network of claim 1, with the first OLT:

selecting the second OLT as a target channel based on at least one of OLT loadings or a policy.

5. The network of claim 1, wherein the network further comprises:

a third OLT in communication with the ONU and with the second OLT, with the upstream channel ID identifies the second OLT, and the downstream channel ID identifies the third OLT.

6. The network of claim 1, wherein the network further comprises:

a third OLT in communication with the ONU and with the second OLT, with the upstream channel ID identifies the third OLT, and the downstream channel ID identifies the second OLT.

7. The network of claim 1, wherein the first OLT is configured to calculate the value of the equalization delay according to a value of a round-trip delay (RTD) of the first OLT and a value of a RTD of the second OLT.

8. The network of claim 1, wherein the upstream channel ID comprises at least one of: an upstream wavelength Channel ID, or an upstream channel termination (CT) ID.

9. The network of claim 1, wherein the equalization delay change message includes a ranging time message.

10. An optical network unit (ONU) in a passive optical network (PON), comprising:

a memory storing programming; and at least one processor coupled to the memory and being configured to execute the programming to perform operations of:

receiving an equalization delay change message from the first OLT, wherein the equalization delay change message comprises a value of an equalization delay for an upstream and downstream wavelength pair, an upstream channel ID and a downstream channel ID, wherein the upstream channel ID contains a descriptor for an upstream wavelength of the upstream and downstream wavelength of the upstream and downstream wavelength pair; and obtaining the value of the equalization delay according to the upstream channel ID and the downstream channel ID for tuning from the first OLT to a second OLT.

11. The ONU of claim 10, wherein the value of the equalization delay includes a delay delta value for tuning an upstream channel and a downstream channel from the first OLT to the second OLT, or a value of an absolute equalization delay of the second OLT.

12. The ONU of claim 10, wherein the equalization delay change message includes a ranging time message.

13. The ONU of claim 10, wherein at least one processor being configured to execute to programming to perform operations of:

receiving a tuning control message from a first optical line terminal (OLT) in the PON, wherein the tuning control message instructs the ONU to tune from the first OLT to a second OLT in the PON.

14. An optical line terminal (OLT) in a passive optical network (PON), comprising:

a memory storing programming; and at least one processor coupled to the memory and being configured to execute the programming to perform operations of:

generating an equalization delay change message, wherein the equalization delay change message comprises a value of an equalization delay for an upstream and downstream wavelength pair, an upstream channel ID and a downstream channel ID, wherein the upstream channel ID contains a descriptor for an upstream wavelength of the upstream and downstream wavelength pair, and the downstream channel ID contains a descriptor for a downstream wavelength of the upstream and downstream wavelength pair; and sending the equalization delay change message to the ONU.

15. The OLT of claim 14, wherein the at least one processor being configured to execute the programming to perform operations of:

selecting the second OLT as a target channel based on at least one of OLT loadings or a policy.

16. A method for channel switching in a passive optical network (PON) comprising a first optical line terminal (OLT), a second OLT, and an optical network unit (ONU), wherein the method comprises:

generating, by the first OLT, an equalization delay change message, wherein the equalization delay change message comprises a value of an equalization delay for an upstream and downstream wavelength pair, an upstream channel ID and a downstream channel ID, wherein the upstream channel ID contains a descriptor for an upstream wavelength of the upstream and downstream wavelength pair, and the downstream channel ID contains a descriptor for a downstream wavelength of the upstream and downstream wavelength pair; and sending, by the first OLT, the equalization delay change message to the ONU.

17. The method of claim 16, wherein the method further comprises:

generating, by the first OLT, a tuning control message, wherein the tuning control message instructs the ONU to tune from the first OLT to the second OLT;

sending, by the first OLT, the tuning control message to the ONU.

18. The method of claim 16, wherein the value of the equalization delay including a delay delta value between the first OLT and the second OLT, or a value of an absolute equalization delay of the second OLT.

19. The method of claim 16, wherein the equalization delay change message includes a ranging time message.

20. The method of claim 16, wherein the method further comprises:

selecting, by the first OLT, the second OLT as a target channel based on at least one of OLT loadings or a policy.

* * * * *